Patented Mar. 4, 1947

2,416,995

UNITED STATES PATENT OFFICE 2,416,995

PROCESS FOR THE MANUFACTURE OF PARA - AMINOBENZENE - SULFONYL-GUANIDINE

Max Hartmann, Riehen, and Harald von Meyenburg, Basel, Switzerland, assignors to Ciba Pharmaceutical Products, Inc., Summit, N. J., a corporation of New Jersey No Drawing. Application October 12, 1942, Serial No. 461,786. In Switzerland December 16, 1941

11 Claims. (Cl. 260—397.7)

It is known that para-aminobenzene-sulfonylguanidine can be produced by the reaction of para-acetylamino- or para-nitrobenzenesulfonic acid chloride with guanidine and subsequent saponification or reduction.

It has now been found that para-aminobenzene-sulfonylguanidine can be produced very advantageously and in excellent yield by causing S-substituted benzenesulfonyl - pseudo-thioureas the benzene nucleus of which is substituted in para-position by an amino group or a substituent convertible into such a group, to react with ammonia and, if desired, converting substituents convertible into amino groups into such groups.

As parent materials there may be used S-substituted benzene-sulfonyl-pseudo-thioureas the benzene nucleus of which contains in para-position an amino group or for example an acylamino, nitro or azo group or halogen atom. Thus one may start from para-substituted S-alkyl-, such as S-methyl-, S-ethyl-, S-propyl- or also from S-aralkyl-, such as S-benzyl-benzene-sulfonyl-pseudo-thioureas. These compounds can be easily obtained by condensing para-substituted benzene-sulfonic acid halides with S-substituted pseudo-thioureas or salts thereof in pyridine.

The reaction may be carried out in the presence or absence of indifferent solvents or in the presence of water. As solvents may be used for example dioxane, alcohol, benzene, toluene, xylol. chlorobenzene, nitrobenzene or tetrachlorethane. The operation may also be conducted in liquid ammonia.

The conversion into an amino group of substituents convertible into such a group may be effected according to the usual methods of working. Thus acylamino compounds may be saponified, nitro- and azo-compounds reduced or halogen compounds reacted with ammonia, whereby amino compounds are produced.

The compounds produced according to the present process find application in therapy or as intermediate products for the manufacture of compounds for therapeutic application.

The following examples illustrate the invention, but are not to be regarded as limiting it in any way, the parts being by weight:

Example 1

26 parts of N-(para-aminobenzenesulfonyl)-S-ethyl-pseudo-thiourea of melting point 159-160° C. (produced by condensing S-ethyl-pseudo-thiourea-hydrobromide with para-acetyl-aminobenzene-sulfochloride in pyridine and subsequent saponification with hydrochloric acid) are boiled with 150 parts of dilute ammonium solution. A vigorous evolution of mercaptan sets in which is complete after 2 hours. There is obtained a clear solution from which para-aminobenzenesulfonyl guanidine is separated in good yield on cooling. It can be purified by recrystallizing from water and has a melting point of 187.5 to 189.5° C.

Instead of N-(para-aminobenzenesulfonyl)-S-ethyl-pseudo-thiourea there is advantageously used also N - (para-aminobenzenesulfonyl) - S - methyl-pseudo-thiourea which is obtained by condensation of S-methyl-pseudo-thiourea-hydrobromide with para-acetylaminobenzene-sulfochloride in pyridine and subsequent saponification.

Example 2

30 parts of N-(para-acetylaminobenzenesulfonyl)-S-ethyl-pseudo-thiourea of melting point 182° C. (prepared by condensation of S-ethyl-pseudo-thiourea-hydrobromide with para-acetylaminobenzene - sulfochloride in pyridine) are boiled with 200 parts of dilute ammonium solution whereby mercaptan escapes. There is obtained a clear solution from which para-acetylaminobenzene-sulfonyl-guanidine is separated in crystalline form on cooling. It is mixed with a small amount of para-aminobenzene sulfonyl-guanidine which has been formed by the dilute ammonium solution by partial saponification.

1 part of the product thus obtained is heated with 2 parts of hydrochloric acid of 17 per cent. strength until it is completely dissolved, the solution is diluted with 3 parts of water, decoloured with animal charcoal and filtered. The para-aminobenzene-sulfonyl-guanidine is precipitated in crystalline form with caustic soda solution and recrystallized from water. It melts at 187.5–189.5° C.

Instead of para-acetylaminobenzenesulfonyl-S-ethyl-pseudo-thiourea there may also be used para - acetylaminobenzene - sulfonyl-S-benzyl-pseudo-thiourea as starting material, which is easily obtainable by condensation of S-benzyl-pseudo-thiourea-hydrochloride with para-acetylaminobenzene-sulfochloride in pyridine.

Example 3

29 parts of N-(para-nitrobenzenesulfonyl)-S-ethyl-pseudo-thiourea (prepared by condensation of S-ethyl-pseudo-thiourea-hydrochloride with para-nitrobenzene-sulfochloride in pyridine) are boiled in a reflux apparatus with 250 parts of dilute ammonium solution and 50 parts of alcohol until the evolution of mercaptan is complete. The para-nitrobenzenesulfonyl-guanidine is separated in crystalline form on cooling. This is then boiled for 3 hours in a reflux apparatus without further purification with a reducing mixture consisting of 20 parts of fine iron powder activated with 10 parts of 2N-hydrochloric acid, 200 parts of water and 200 parts of alcohol. The alcohol is distilled off; the residue is made alkaline to litmus by addition of caustic soda solution and suction-filtered while hot. When cold, para-aminobenzenesulfonyl-guanidine crystallizes from the filtrate. For the purpose of purification it is dissolved in dilute hydrochloric acid, decolored with animal charcoal, precipitated with caustic soda solution and crystallized from water. It melts at 188–190° C.

What we claim is:

1. In a process for the manufacture of para-amino-benzenesulfonyl guanidine, the step of causing ammonia to react with an S-substituted N-benzene-sulfonyl-pseudo-thiourea, the benzene nucleus of which is substituted in para-position by a member of the group consisting of amino, acylamino and nitro, the S-substituent being selected from the group consisting of lower alkyl and aralkyl.

2. A process for the manufacture of para-amino-benzenesulfonyl guanidine, which comprises causing ammonia to react with an S-substituted N-benzene-sulfonyl-pseudothiourea, the S-substituent being selected from the group consisting of lower alkyl and aralkyl, the benzene nucleus of which is substituted in para-position by an acylamino group, and then reacting the resulting product with a hydrolyzing reagent whereby said para-substituent is directly converted into the amino group.

3. A process for the manufacture of para-aminobenzenesulfonyl guanidine, which comprises causing ammonia to react with an S-substituted N-benzene-sulfonyl-pseudo-thiourea, the S-substituent being selected from the group consisting of lower alkyl and aralkyl, the benzene nucleus of which is substituted in para-position by a nitro group, and then reacting the resulting product with a reducing reagent whereby said para-substituent is directly converted into the amino group.

4. In a process for the manufacture of para-aminobenzenesulfonyl guanidine, the step of causing ammonia to react with an N-benzene-sulfonyl-pseudo-thiourea which is substituted at the sulfur atom of the thiourea by a lower alkyl group and the benzene nucleus of which is substituted in paraposition by a member of the group consisting of amino, acylamino and nitro.

5. A process for the manufacture of para-aminobenzenesulfonyl guanidine, which comprises causing N-(para-aminobenzenesulfonyl)-S-ethyl-pseudo-thiourea to react with ammonia.

6. A process for the manufacture of para-amino-benzenesulfonyl guanidine, which comprises causing N-(para-acetylaminobenzenesulfonyl)-S-ethyl-pseudo-thiourea to react with ammonia, and treating the reaction product with a hydrolyzing agent.

7. A process for the manufacture of para-aminobenzenesulfonyl guanidine, which comprises causing N-(para-acetylaminobenzenesulfonyl)-S-alkyl-pseudo-thiourea to react with ammonia, and treating the reaction product with a hydrolyzing agent.

8. A process for the manufacture of para-aminobenzene-sulfonyl guanidine, which comprises causing ammonia to react with an S-lower alkyl substituted, N-(para-acylaminobenzene sulfonyl) pseudo-thiourea, and then reacting the resulting product with a hydrolyzing reagent whereby the acylamino group is converted into the amino group.

9. A process for the manufacture of para-amino-benzene sulfonyl guanidine, which comprises causing ammonia to react with an S-aralkyl substituted N-(para-acylaminobenzene sulfonyl) pseudo-thiourea, and then reacting the resulting product with a hydrolyzing reagent whereby the acylamino group is converted into the amino group.

10. A process for the manufacture of para-aminobenzenesulfonyl guanidine, which comprises causing ammonia to react with an S-lower alkyl substituted N-(para nitrobenzene sulfonyl) pseudo-thiourea, and then reacting the resulting product with a reducing reagent whereby said nitro group is converted to the amino group.

11. A process for the manufacture of para-aminobenzene sulfonyl guanidine, which comprises causing ammonia to react with an S-alkaryl substituted N-(para-nitro-benzene sulfonyl) pseudo thiourea, and then reacting the resulting product with a reducing reagent whereby said nitro group is converted to the amino group.

MAX HARTMANN.
HARALD von MEYENBURG.

REFERENCES CITED

The following references are of record in the file of this patent:

UNITED STATES PATENTS

| Number | Name | Date |
|---|---|---|
| 1,785,916 | Schotte | Dec. 23, 1930 |
| 1,672,029 | Heyn | June 5, 1928 |

OTHER REFERENCES

Marshall et al., Bull. Johns-Hopkins Hospital, Sept. 1940, pages 163-168.